Dec. 20, 1927.
R. W. MELLOR
1,653,016
MASON'S SCALE
Filed April 25, 1927
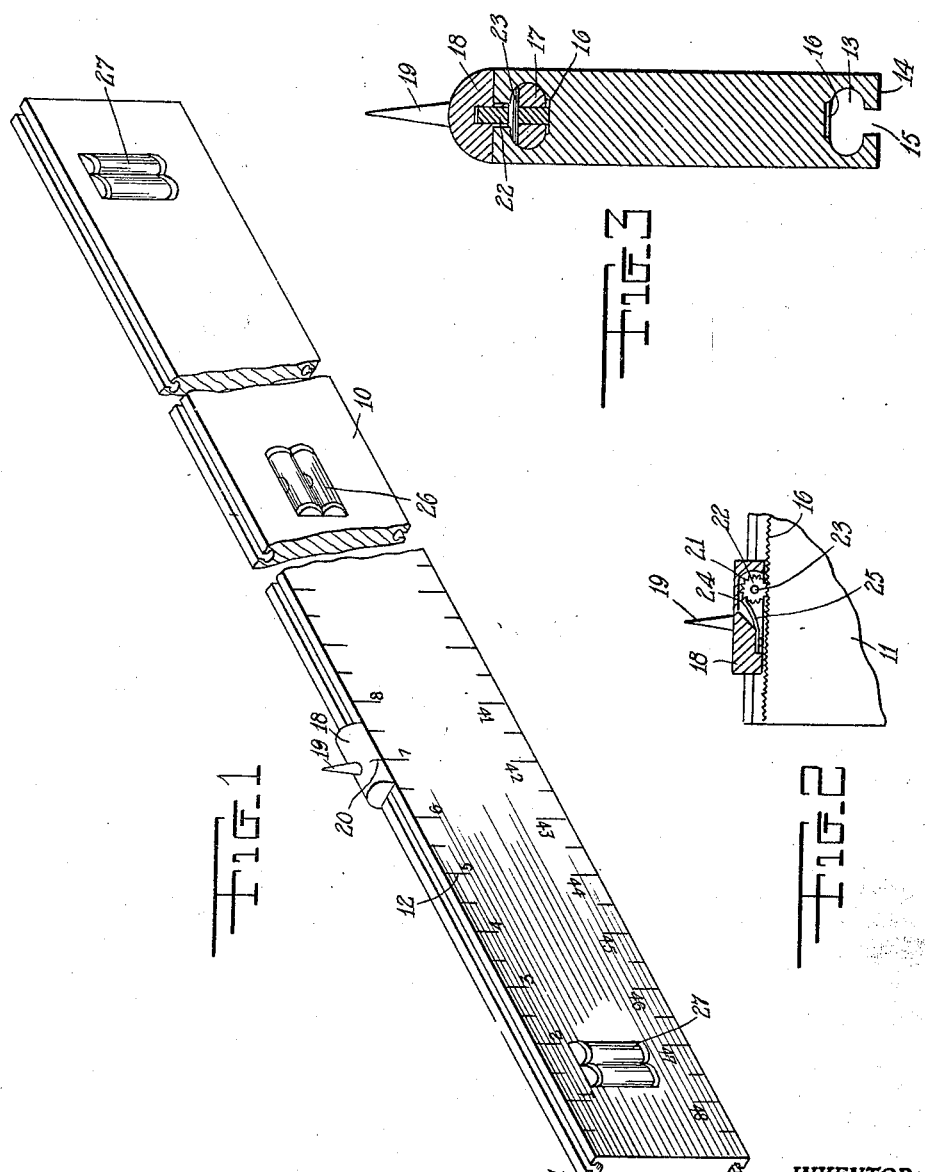
INVENTOR
R.W.Mellor
BY
J. Ledermann
ATTORNEY Patented Dec. 20, 1927.

1,653,016

UNITED STATES PATENT OFFICE.

ROBERT W. MELLOR, OF NEW YORK, N. Y.

MASON'S SCALE.

Application filed April 25, 1927. Serial No. 186,532.

The main object of this invention is to provide a scale suitable for use in the laying of bricks. The scale is provided with carriages upon which pointers are formed, the pointers being adapted to indicate the distance between the carriages, it being noted that the pointers are used in pairs for the purpose of indicating the linear distance between a desired number of courses of bricks.

The above and other objects will become apparent in the description below, in which characters of reference refer to like-named parts in the drawing.

Referring briefly to the drawing, Figure 1 indicates a perspective view of the scale, showing one of the characters mounted thereon.

Figure 2 is a longitudinal sectional elevational view thru one corner of the scale, showing the carriage in cross section and the means of releasably positioning said carriage in any desired location with respect to the length of the scale.

Figure 3 is an enlarged cross sectional view thru the scale and carriage.

Referring in detail to the drawing, the numeral 10 indicates one of the faces of a flat longitudinal scale 11. The face 10 is provided with graduations 12 which indicate inches and extend adjacent the longitudinal edges of said scale. The longitudinal edges of the scale 11 are provided with channels 13 elliptical in cross section which extend the entire length of the scale and are formed below the surfaces of the edge faces 14. These channels are substantially oval in cross section and communicate with the faces 14 thru slits 15. The base surface of the channel 13 opposite to the slit 15 is provided with a plurality of V-shaped grooves 16, the purpose for which will be more fully hereinafter described. The channels 13 of the scale are adapted to receive the guide lugs 17 of one or more carriages 18 which project from the edge faces 14 of the scale and are adapted to ride on these faces. These carriages are provided with pointers 19 which extend outwardly from the same and the tip of these pointers is aligned with an index graduation 20, which latter is formed on the side of the carriage and is adapted to cooperate with the graduations 12 on the scale in the manner shown in Figure 1. A recess 21 is formed within the carriages 18 and harbors a toothed wheel 22 which is engaged with the grooves 16 in the channel 13 and is journalled on a stud 23. The free end 24 of a resilient finger 25, which is secured in the recess 21, engages the grooves formed on the periphery of the toothed wheel 22 and serves as a catch for releasably positioning said wheel in the grooves 16. Intermediate the length of member 10, a pair of horizontal bubbles 26 are embedded and are adaptable for horizontal levelling while at the ends similar bubbles 27 are mounted vertically for vertical levelling.

Scales are a necessary part of the equipment of a mason's kit and the most important purpose for a scale is to measure the distance necessary between required courses of bricks. The carriages are used in pairs in the same channel and the distance between the indicating graduation 20 of the carriages is equal to the number of courses of bricks it is desired to build over a measured distance on the scale. These carriages are made movable in such manner that they may be placed in any position with reference to the length of the scale and automatically lock in position thru means of the toothed wheel 22 engaging the grooves 16 in the channels 17 of the scale. This toothed wheel is locked against inadvertent rotation by the resilient finger 25 which engages the teeth of the wheel and prevents rotation of the same. It is to be noted that the tool may be used with or without the carriages accordingly as desired, the construction being such as will permit the carriages to be readily detached from place.

It is also to be noted that certain changes in form and construction may be made without departing from the spirit and scope of the invention.

I claim:—

1. A scale having a channel oval in cross section and extending longitudinally thereof, a slot communicating with said channel and a longitudinal edge of said scale, V-shaped grooves in said channel, a carriage projecting from said scale guided in said channel and slidable on said scale, and means engaging said grooves in said channel for releasably locking said carriage in any desired position.

2. A scale having a channel oval in cross section and extending longitudinally thereof, a slot communicating with said channel and a longitudinal edge of said scale, V-shaped grooves in said channel, a carriage projecting from said scale guided in said channel and slidable on said scale, a guide lug on said carriage slidable in said channel, a pointer projecting from said carriage, and rotatable means in said guide lugs engaging said grooves in said channel for releasably locking said carriage in any desired position.

3. A scale having a longitudinal oval channel, a slot communicating with said channel and the side of said scale, V-shaped grooves in said channel, a carriage projecting from said scale guided in said channel and slidable on said scale, a guide lug on said carriage slidable in said channel, a pointer projecting from said carriage, said lug and carriage having a recess therein, a toothed wheel rotatably mounted in said recess engaging the grooves of the channel, and a resilient finger mounted in said recess engaging the teeth of said wheel for releasably locking the latter against rotation.

In testimony whereof I affix my signature.

ROBERT W. MELLOR.